(12) United States Patent
Lössl et al.

(10) Patent No.: US 11,338,491 B2
(45) Date of Patent: May 24, 2022

(54) CONTROL APPARATUS FOR PRODUCING AND/OR HANDLING A PLASTIC FILM

(71) Applicant: Brückner Maschinenbau GmbH & Co. KG, Siegsdorf (DE)

(72) Inventors: Simon Lössl, Inzell (DE); Wilhelm Wagner, Kuchl (AT); Wolfgang Zintz, Vachendorf (DE)

(73) Assignee: Brückner Maschinenbau GmbH & Co. KG, Siegsdorf (DE)

( * ) Notice: Subject to any disclaimer, the term of this patent is extended or adjusted under 35 U.S.C. 154(b) by 600 days.

(21) Appl. No.: 16/314,551

(22) PCT Filed: Jun. 22, 2017

(86) PCT No.: PCT/EP2017/065369
§ 371 (c)(1),
(2) Date: Dec. 31, 2018

(87) PCT Pub. No.: WO2018/001852
PCT Pub. Date: Jan. 4, 2018

(65) Prior Publication Data
US 2019/0240888 A1 Aug. 8, 2019

(30) Foreign Application Priority Data
Jul. 1, 2016 (DE) .................... 10 2016 112 121.5

(51) Int. Cl.
*B29C 48/92* (2019.01)
*B29C 55/06* (2006.01)
(Continued)

(52) U.S. Cl.
CPC .......... *B29C 48/92* (2019.02); *B29C 48/0018* (2019.02); *B29C 48/08* (2019.02);
(Continued)

(58) Field of Classification Search
CPC ....... B29C 48/92; B29C 48/914; B29C 48/08; B29C 48/10; B29C 48/919;
(Continued)

(56) References Cited

U.S. PATENT DOCUMENTS

| 5,229,140 A | 7/1993 | Crass et al. |
| 2003/0050717 A1 | 3/2003 | Hirata et al. |
| 2009/0243133 A1 | 10/2009 | Wong |

FOREIGN PATENT DOCUMENTS

| CN | 201195393 | 2/2009 |
| CN | 105437493 | 3/2016 |

(Continued)

OTHER PUBLICATIONS

Office Action issued in KR App. No. 10-2019-7003324 (dated Feb. 18, 2021) (w/ translation).
(Continued)

*Primary Examiner* — Jeffrey M Wollschlager
*Assistant Examiner* — Xue H Liu
(74) *Attorney, Agent, or Firm* — Nixon & Vanderhye P.C.

(57) ABSTRACT

An improved control apparatus for producing plastic films and an associated improved method are distinguished, inter alia, by the following features: —the control apparatus has two stages or at least two stages, —the control apparatus comprises, for this purpose, a sensor module and/or a sensor model and a process module and/or a process model, —the machine-dependent sensor module and/or sensor model and the production-dependent process module and/or process model are linked or can be linked to one another via production variables, —adjustable machine variables are connected or linked to plant production variables via the sensor module and/or the sensor model.

17 Claims, 9 Drawing Sheets

(51) Int. Cl.
  *B29C 48/08* (2019.01)
  *B29C 48/10* (2019.01)
  *B29C 48/00* (2019.01)
  *B29C 48/91* (2019.01)
  *B29C 48/88* (2019.01)
  *B29C 55/12* (2006.01)
  *B29C 48/28* (2019.01)
  *B29C 55/14* (2006.01)
  *B29C 51/02* (2006.01)
  *B29C 55/16* (2006.01)
  *B29K 23/00* (2006.01)

(52) U.S. Cl.
  CPC .............. *B29C 48/10* (2019.02); *B29C 48/91* (2019.02); *B29C 48/914* (2019.02); *B29C 48/919* (2019.02); *B29C 55/06* (2013.01); *B29C 55/12* (2013.01); *B29C 48/28* (2019.02); *B29C 48/911* (2019.02); *B29C 51/02* (2013.01); *B29C 55/14* (2013.01); *B29C 55/16* (2013.01); *B29C 2948/9259* (2019.02); *B29C 2948/92209* (2019.02); *B29C 2948/92447* (2019.02); *B29C 2948/92514* (2019.02); *B29C 2948/92523* (2019.02); *B29C 2948/92619* (2019.02); *B29C 2948/92628* (2019.02); *B29C 2948/92647* (2019.02); *B29C 2948/92666* (2019.02); *B29C 2948/92704* (2019.02); *B29C 2948/92923* (2019.02); *B29C 2948/92933* (2019.02); *B29C 2948/92971* (2019.02); *B29K 2023/12* (2013.01); *B29K 2995/0051* (2013.01); *B29K 2995/0053* (2013.01)

(58) Field of Classification Search
  CPC ..... B29C 48/0018; B29C 48/91; B29C 55/06; B29C 55/12; B29C 2948/92523; B29C 2948/92209; B29C 2948/92647; B29C 2948/92704; B29C 2948/92933; B29C 2948/9259; B29C 2948/92971; B29C 2948/92447; B29C 2948/92923; B29K 2995/0051; B29K 2995/0053
  See application file for complete search history.

(56) References Cited

FOREIGN PATENT DOCUMENTS

| DE | 10 2004 026 642 | 12/2005 |
| DE | 10 2013 007 669 | 11/2014 |
| EP | 0 505 960 | 9/1992 |
| JP | 5-92472 | 4/1993 |
| JP | 6-297568 | 10/1994 |

OTHER PUBLICATIONS

International Search Report and Written Opinion of the PCT/EP2017/065369 dated Sep. 29, 2017, 12 pages.

CONTROL APPARATUS FOR PRODUCING AND/OR HANDLING A PLASTIC FILM

This application is the U.S. national phase of International Application No. PCT/EP2017/065369 filed Jun. 22, 2017 which designated the U.S. and claims priority to DE Patent Application No. 10 2016 112 121.5 filed Jul. 1, 2016, the entire contents of each of which are hereby incorporated by reference.

DESCRIPTION

The invention describes a control apparatus for manufacturing and/or treating a plastics film, in particular in the form of a film manufacturing plant, and an associated method.

In this case, the control means according to the invention is intended to relate to the entirety of the possible manufacturing process for manufacturing films, in particular flat sheet films. This also includes the manufacture of cast films. The scope of the invention also covers the manufacture of what are known as blown films, the manufacturing method of which is frequently also referred to as a "double-bubble blow process".

In other words, the invention relates to all possible manufacturing methods for manufacturing plastics films, the manufacture of flat sheet films of this kind on the various types of stretching units, including the manufacture of cast films and the manufacture of blown films, including the mentioned double-bubble blown films, being known in principle to a person skilled in the art. Reference is made in this respect to known solutions.

The control means is intended to relate to the entire manufacturing plant for films or cast films, and not only to the stretching unit, i.e. from the granulate feed or polymerisation until the final finished film. The sequential or simultaneous stretching of the film is only a portion of the overall production plant, and the invention is not intended to be restricted thereto.

The method according to the invention is likewise intended to be used in what are known as cast film plants. A person skilled in the art is familiar with the corresponding plant components. The control method can in principle also be used in blown film and double-bubble processes.

Film manufacturing involves very complex production plants that are associated with a plurality of machine and process variables that have to be implemented by a central control system. In this case, a plurality of items of data have to be mutually associated. Above all, a significant number of empirically obtained practical values enter into the correct startup and control of a plant of this kind. In other words, the experience and knowledge base of the methods engineers involved and of the people operating the plant is very important.

FIG. 10 is a schematic, simplified view of the basic design or the basic structure of an earlier control apparatus, i.e. an earlier machine control means for film manufacturing plants of this kind, by means of which a film having particular product characteristics, for example, can be created. For this purpose, the relevant production variables of the individual method steps (e.g. extrusion, pre-film production, lengthwise and/or transverse stretching, etc.) have to be mutually associated in a suitable manner, using the machine variables, by means of the knowledge of the methods engineer and/or of the operator and by means of empirical data.

When operating a film manufacturing plant of this kind, for example m machine variables (m being a value over 1000) are determined at the individual components of the film manufacturing plant by means of measurement technology, i.e. for example measured values such as the temperature or the pressure, etc.

In order to obtain a specific process variable, the machine variables then have to be set and controlled by means of control technology.

In this case, all the machine and process variables are mutually dependent. The product characteristics are in turn dependent thereon.

In this case, in the mentioned FIG. 10, a person (or several people) operating the plant is denoted by P and controls the entire control apparatus or control means E by way of what is known as machine visualisation MV, the machine visualisation MV being part of the overall control means.

The machine visualisation explained with reference to FIG. 10 results in a substantial and very confusing overall structure with respect to the plurality of measured variables, parameters, etc. that have to be taken into account, monitored, checked and/or set differently.

This is indicated only very schematically, on the basis of FIG. 11, for a solution known from the prior art only for a lengthwise stretching unit (MDO, machine direction orienter, i.e. without a transverse stretching means).

In this case, the centre of FIG. 11 shows, proceeding from left to right, the individual stations of the lengthwise stretching unit, comprising separate roller pairs that may belong to different pre-heating groups VH1 to VH12 (this is merely by way of example) with respect to a specific lengthwise stretching unit, the rollers then being followed by lengthwise stretching rollers LW, a pair of lengthwise stretching rollers resulting in each case from the different speed of rotation of individual lengthwise stretching stages. Heat post-treatment rollers NH1 to NH4, for example, can then follow said lengthwise stretching stages LR1 to LR4 before the film is then fed to a transverse stretching stage (see also reference sign 17 in FIG. 1 which will be explained in more detail later) or an optional coating unit (corresponds to reference sign 15 in FIG. 1 which will be explained in more detail later).

What is known as the casting unit (corresponds to reference sign 9 in FIG. 1 which will be explained in more detail later), i.e. the roller unit in which the molten film is generally transferred to a chill roll and passed through a water bath before the cast film is fed to the first pre-heating rollers of the MDO, is usually connected upstream, on the input side.

A plurality of parameters, machine variables, temperature values, etc. can be read out, monitored and/or set on a display assembly of this kind according to FIG. 11, above and below the above-described components of the lengthwise stretching unit or, in general terms, a film manufacturing plant, because the effect of the change in the machine variables is intended to be such that, in the individual stages and steps of the manufacturing process, the material web created using said parameters, in particular in the form of a plastics film, has as exactly as possible those values which then result, according to the invention, in the end product that comprises precisely the desired end product characteristics.

In this case, FIG. 11 provides an example of machine visualisation MV for a lengthwise stretching frame in order to give an impression of the influencing variables, such as the machine variables in the form of target and actual temperatures of the individual lengthwise stretching rollers, the torques, the stretching gaps, etc.

The m values of the machine variables of course influence the production variables such as, in this case, the lengthwise stretching ratio, the temperatures before and after the individual rollers, the shrinkage of the film, etc. Said production variables are of course influenced by the preceding process steps, and the following processes are determined by said steps.

Similar of course applies for the product characteristics.

The desired product characteristics are achieved by means of empiricism and the experience base of the methods engineer/operator.

In this case, it is important to note that the number n of process variables is significantly smaller than the number of machine variables, n<<m.

However, these settings in no way represent the optimum for the process variables; it is entirely possible that at least one product characteristic, e.g. the haze value, i.e. the value for the turbidity of the film, or a production variable, e.g. the energy consumption, can be optimised. The product characteristics required by a customer could thus be improved and the energy consumption minimised.

In addition, it should be noted that, as well as the film manufacturing plants described, the manufacture of what are known as cast films may also be important, specifically in the form of what is known as a cast film plant. This is generally a plant type in which a plastics melt is deposited on a chill roll by means of a wide die and this comparatively thick plastics film or this thick plastics film then does not undergo any further stretching process. The comparatively thick plastics film thus obtained can then be further processed in a subsequent method step, for example in a deep-drawing process.

The claimed control method can in principle equally be applied to film manufacturing plants according to the known blown film and double-/tri-bubble process and the like.

The object of the present invention is that of providing, proceeding from this prior art, an improved control apparatus for manufacturing and/or treating a plastics film, and an improved associated method for controlling a film plant of this kind, in which the overall operation is improved and simplified compared with conventional control apparatuses comprising associated machine visualisation.

The solution according to the invention is characterised inter alia in that a structure according to the invention that is entirely different from the prior art and a design of the overall control system that is different from the prior art make it much easier to manufacture corresponding films, in particular also films that are constructed and assembled from different materials and films that comprise different materials, even in film manufacturing plants of different designs (i.e. in respect of all flat sheet film manufacturing methods and manufacturing methods for cast, blown and/or what are known as double-bubble or tri-bubble processes or the like).

In this case, the control system is significantly simplified compared with conventional machine control systems. It has been made possible, within the context of the invention, to make the overall control system and the control method less complex. Within the context of the invention, the machine variables to be taken into account in previous control methods (in general significantly more than 1000 machine variables are present) can be reduced to a much smaller number of process variables, for example such that the number of process variables to be controlled and/or influenced is between 10 and 100, i.e. smaller by at least a factor of 10 than the number of machine variables to be taken into account hitherto.

In this case, it is also possible within the context of the invention to reproduce and expand the available knowledge and skills of the operating personnel and of the methods engineers using technical means, while achieving constantly high product quality and high efficiency of the production process.

The plant control system according to the invention, i.e. the control apparatus or control means according to the invention, is characterised in that the overall control system is arranged in two groups that are coupled together, said groups being referred to as modules and also being mutually separate or separable in terms of hardware.

This is what is known as a sensor group, also referred to in the following as a sensor module SM.

The further group, interacting therewith, relates to what is known as the process group, also referred to in the following as process module PM.

In this case, the sensor module contains a sensor model which preferably acquires machine variables during ongoing operation, by means of inline measurement technology, i.e. actual value measurement technology, with respect to a plurality of said machine variables, and said variables are provided to and/or processed by the sensor module, i.e. what is known as the sensor model.

In this case, the machine variables comprise the entire production process for a material web, in particular in the form of a plastics film, for which purpose data are required relating to the raw material, the extrusion of the viscous raw material from the die (in particular the slot die), what is known as the molten or cast film, the roller temperature (surface temperature) of the chill roll, the water bath temperature, the drive speeds of the various rollers for example for generating lengthwise stretching, the drive speeds of the rotating die stocks for conveying the plastics film, the surface temperatures of the various rollers used, and the temperature data regarding additionally provided heating and/or cooling means, fan speeds, etc., as well as data regarding the pull rolls and the winding means or the winder roll, which are all included in the machine variables.

Said machine variables which contain a plurality of separate items of data regarding each of the mentioned classes of data can be processed in the sensor model, in accordance with the plant, such that specific machine variables correspond in each case to specific production variables for the plastics film web in the respective portions of the manufacturing process.

In other words, the production variables, such as the starting material for manufacturing the plastics film web, the temperature during the various processing steps for the plastics film web, the lengthwise stretching ratios, the transverse stretching ratios, the initiation of post-treatment for example below the film that is stretched in the length and/or transverse direction, while generating a particular web tension and while building up specific tensile forces acting on the material web in the length direction, are related to those production variables that can be correlated, in a plant-dependent manner, with particular plant-specific machine variables.

Proceeding from the above-mentioned production variables, the desired process variables can then be set in the process module or process model placed on the sensor module or sensor model, in the respective manufacturing portions of the film manufacturing plant, which variables are in turn correlated by a specified transfer function, by means of the process module in the form of what is known as the process model, with the mentioned production variables such as the starting material, temperature, lengthwise and/or transverse stretching ratios, transverse tension of the web, tensile forces in the length direction, etc.

In other words, the above-mentioned machine variables are thus ultimately a function of the production variables and, vice versa, the production variables are a function of the machine variables.

Likewise, the process variables regarding said plastics film are a function of the production variables and, vice versa, the production variables are in a functional correlation with the process variables.

According to the invention, during the manufacturing phase of a plastics film that is stretched in the length and/or transverse direction, for example, it is now necessary to accordingly set, with respect to the individual manufacturing stages, i.e. for example the thickness of a film in a very specific manufacturing step, the shrinkage generated, the E-modulus, the clarity of the film or the turbidity of the film (haze), etc., only the production variables which result in a specific product characteristic of the finished manufactured plastics film.

Likewise, the product characteristics of an end product in the form of a stretched plastics film can be used to determine the production variables required for achieving said characteristics, i.e. said production variables can be adjusted to specific product characteristics of the film in the individual steps preceding the end product, i.e. at the time of producing the cast film, cooling or heating the film, lengthwise stretching that is carried out and subsequent transverse stretching, and post-treatment, etc.

The explanations thus show that the design according to the invention or the structure according to the invention is two-stage or at least two-stage, specifically making use of what is known as a sensor model, and a process model placed thereon. As will also be seen later, from the detailed description, it is thereby possible to also provide what is known as "product visualisation" and for example "assistance systems". This structural design, which is completely different from the prior art, thus results in a different way of determining and processing data and an entirely new way of controlling a corresponding machine and plant.

The invention will be explained in greater detail in the following, with reference to drawings. In the drawings, in detail:

Figure 1:
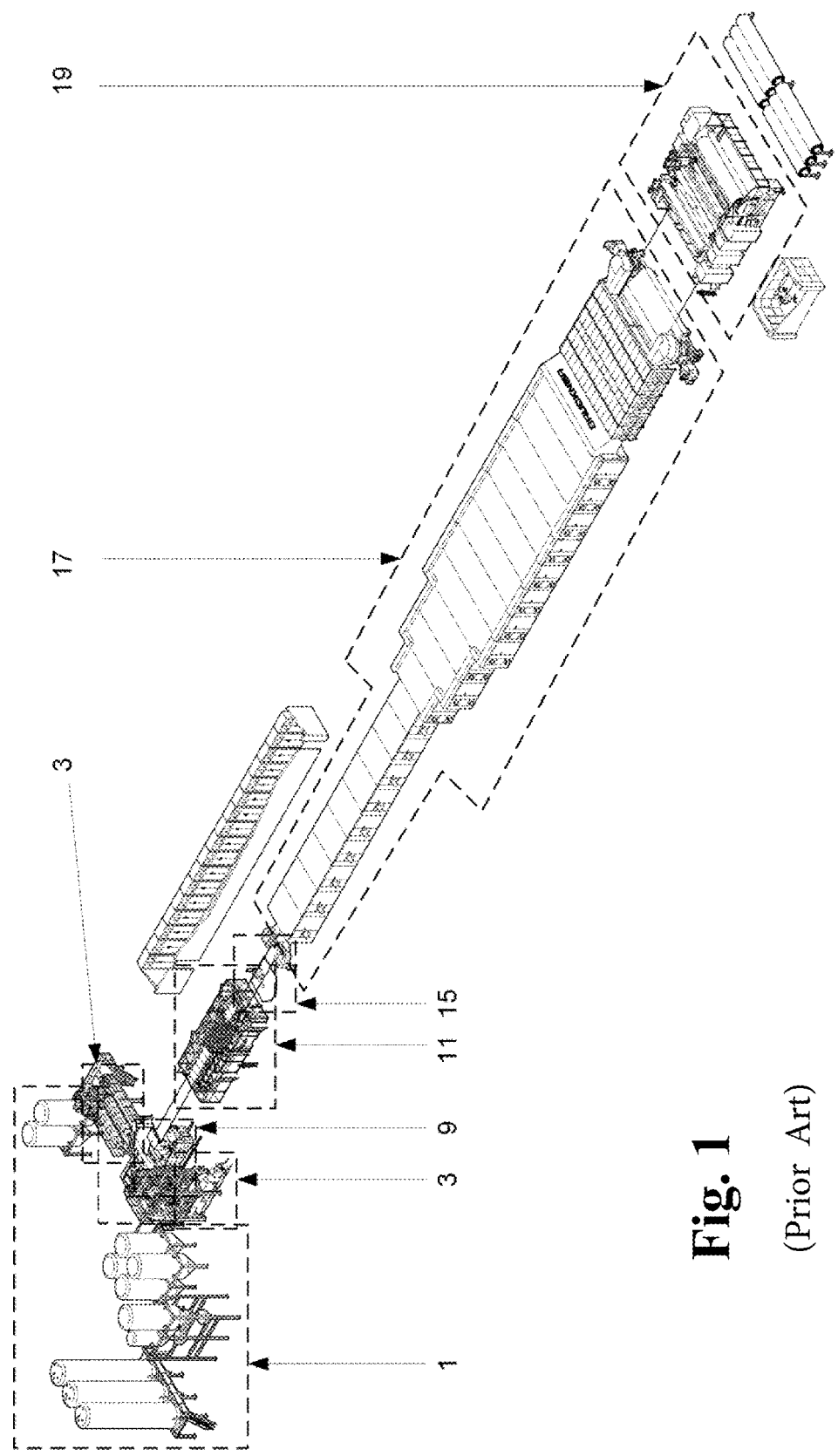
FIG. 1 is a schematic view of the basic structure of a film manufacturing plant.

In the flat sheet film method, films are manufactured by means of monoaxial, uniaxial, simultaneous biaxial, or sequential biaxial stretching, as is shown schematically in FIG. 1.

Plastics raw materials are stored for example in silos 1 and fed to the extrusion process. In the case of what are known as direct casting plants, the polymer is fed directly to the slot die. In principle, various additives and functional materials can be added to the melt stream or granulate. A polymer melt homogenised in an extruder 3 is extruded, through a slot die, onto a film drawing machine 9 comprising a chill roll.

In the case of sequential biaxial stretching, the approximately amorphous pre-film (this applies for example for PET) or the crystalline pre-film (e.g. in the case of PP) is guided over temperature-controlled rollers following the chill roll 9, and re-heated to a stretching temperature of a few degrees Celsius above the glass transition temperature.

Monoaxial and uniaxial stretching involves stretching in just one direction. The difference between the two stretching modes is that, in the case of monoaxial stretching, the edges are free and therefore, in a manner comparable to the stretching of polymer threads, the film edges can be narrowed freely, whereas in the case of uniaxial stretching the lateral fixing of the film edges prevents narrowing.

In the case of stretching using stretching rollers 11 having different circumferential speeds, the friction between the roller surface and the film surface of a film web to be treated, also sometimes referred to for short in the following simply as film, results in an approximately uniaxial orientation with only minor lateral narrowing of the film. Optional surface treatment 15, for example coating, may take place between the steps of lengthwise and transverse stretching or before the simultaneous stretching. Likewise, the finished film can undergo treatment of this kind before or after winding.

Sequential biaxial and simultaneous biaxial stretching 17 involve stretching of a film in two directions, and this may be carried out successively (sequentially) or at the same time (simultaneously). The stretching in the length direction takes place between two stretching rollers having different circumferential speeds. In newer, high-speed film manufacturing plants, the lengthwise stretching of the pre-film is carried out in two stages. In the sequential stretching process, stretching in the direction perpendicular to the film alignment takes place following the lengthwise stretching, in a stretching furnace.

In the case of the simultaneous biaxial stretching process, the extruded, cooled pre-film is fed into the stretching furnace in the unstretched state and subsequently stretched. The film may undergo additional treatment, such as surface treatment, before and after stretching. Following the drawing unit (pull roll) 19, the finished film is wound onto rolls.

However, the method according to the invention can likewise be applied in or for cast film plants. Therefore, the control method according to the invention, which will be described more in the following, can also be used, together with the associated control apparatus, in plants of this kind.

In this case, as has already been mentioned several times, the control method according to the invention which is described is suitable not only for manufacturing flat sheet films in general, including using the various known stretching units, but can instead also be used when manufacturing blown films or films that are manufactured according to the double-bubble or tri-bubble process or processes that are comparable or similar thereto.

A person skilled in the art is familiar with the corresponding plant components of film manufacturing plants of this kind. Reference is made in this respect to known plants.

Control Apparatus According to the Invention

The basic structure of the control apparatus according to the invention and of the method according to the invention for manufacturing a plastics film web will be explained in the following with reference to FIGS. 2 and 3.

Before the solution according to the invention is discussed, the following terminology definitions should first be provided:

Methods Engineer/Operator or Operating Personnel

The operator is a physical person who interprets the machine outputs and makes the necessary inputs, with the aim of producing a product.

Process Visualisation

The process visualisation is an operator interface by means of which an operator can view and change primarily process variables.

Machine Visualisation

The machine visualisation is an operator interface by means of which the operator can view and change primarily machine variables.

Assistance System

An assistance system guides the operator when completing specific tasks. The sequence of actions stored in the assistance system is intended to help make the operation simpler, more reliable, and more efficient.

Process Variable

Process variables are characteristics of the material to be processed, across the entire production process. Typical variables are the film temperature, film tension, film thickness, etc. Process variables comprise production variables and product characteristics.

Product Characteristics

The product characteristic is a process variable that describes the final product, e.g. film thickness.

Production Variable

The production variable is a process variable that describes the production process in all production stages, e.g. film temperature and film tension.

Process Model/Process Module

The process model qualitatively and quantitatively establishes the link between the production variables and product characteristics. The process model acts bidirectionally, i.e. product characteristics can be concluded from production variables and vice versa. In this case, the process model can be implemented in a process module.

Sensor Model/Sensor Module

The sensor model qualitatively and quantitatively establishes the link between the machine variables and process variables. The sensor model acts bidirectionally, i.e. process variables can be concluded from machine variables and vice versa. The sensor model can be implemented in a sensor module.

Machine Variable

Machine variables are characteristics of the machine, e.g. cooling water temperature, fan speed.

Figure 10:
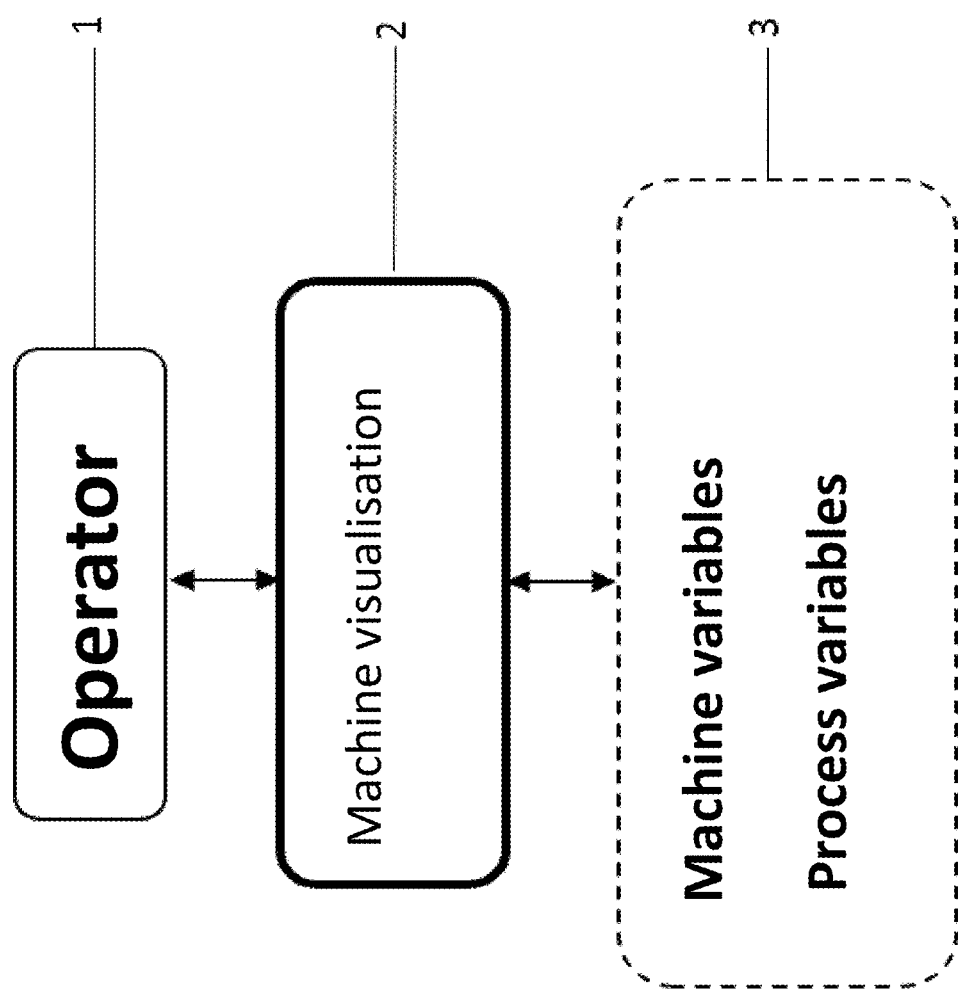
FIG. 10 is a schematic basic illustration of the machine control system known according to the prior art.

It is already clear from the explanation of the control method known from the prior art, according to FIG. 10, that, in order to manufacture a plastics film, it is ultimately necessary to set the machine such that the plastics film is produced exactly thereby, having the exact product characteristics desired.

In other words, a link between the machine variables and the product characteristics must ultimately always be established such that the desired plastics film can be produced having the most exact possible desired parameters.

Figure 2:
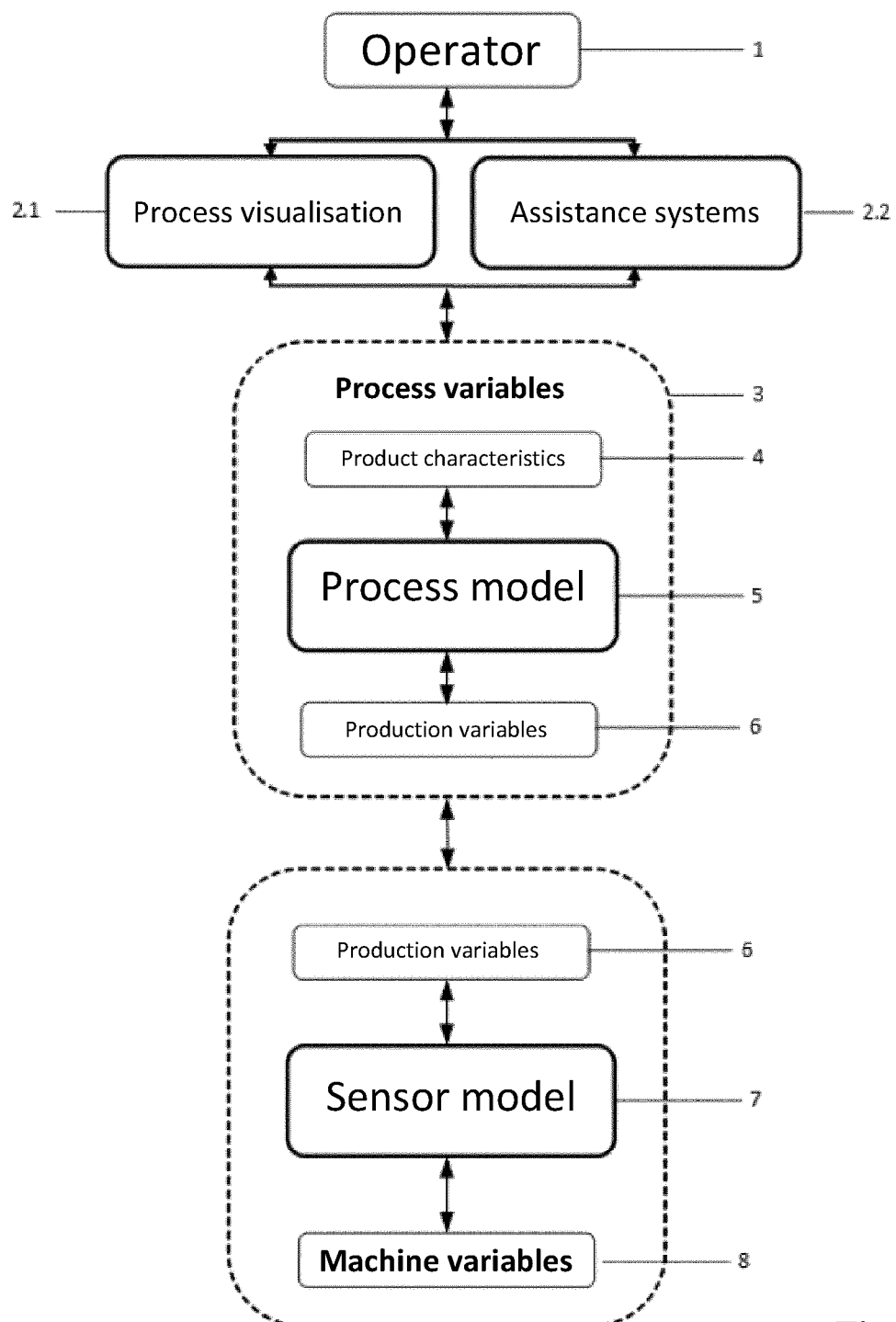
FIG. 2 is a first schematic structural basic illustration of the solution according to the invention using a sensor module/implemented sensor model and a process module that is constructed thereon and comprises an implemented process model.
Figure 3:
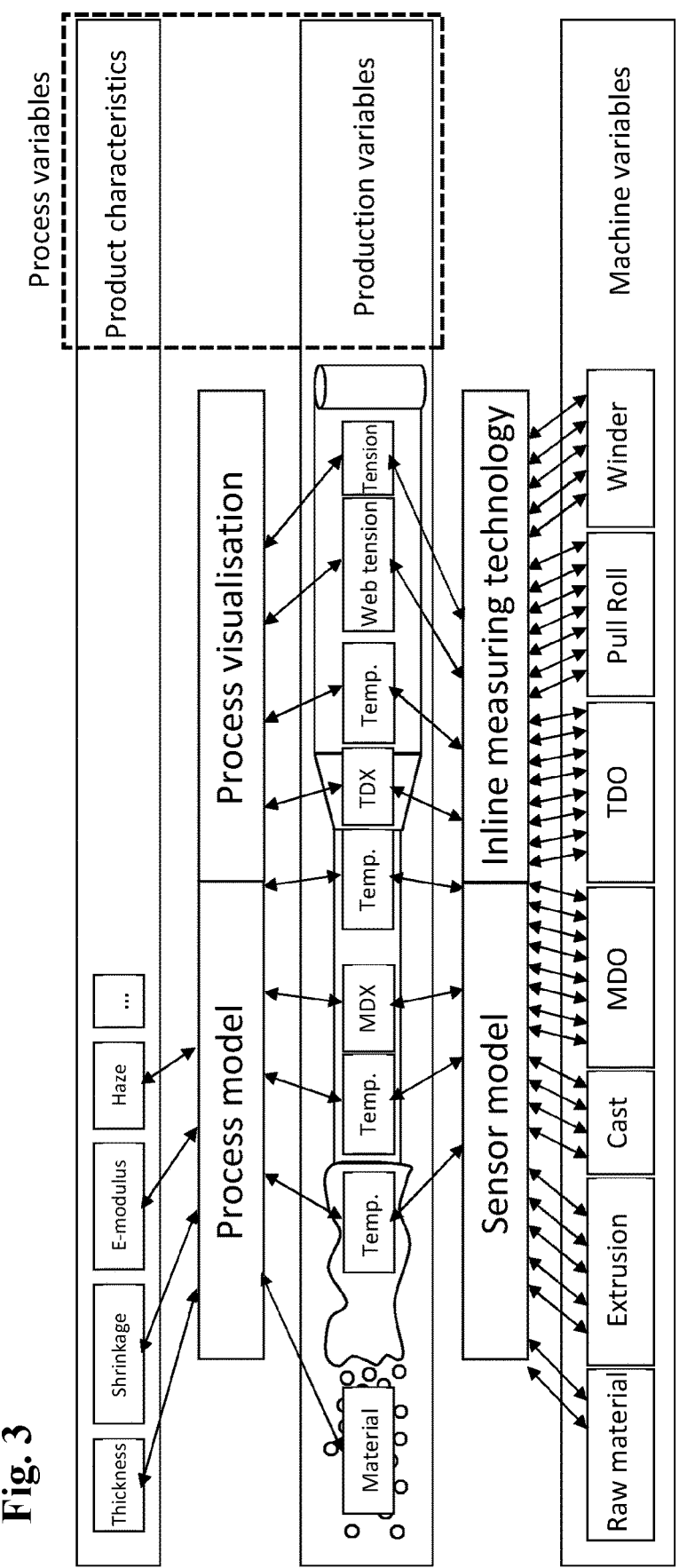
FIG. 3 is a more detailed schematic view according to the invention.

In contrast to the previous design of a corresponding control apparatus according to FIG. 10, FIGS. 2 and 3 now show the structural design according to the invention of a corresponding control apparatus, which is characterised by a two-stage or at least two-stage design. In this case, one stage relates to the sensor module or sensor model and the second stage relates to what is known as the process module or process model. According to FIG. 2, a process visualisation stage or what is known as an assistance system may be provided or implemented thereabove, facilitating the overall operation. The process visualisation last mentioned and/or the assistance system can be considered an additional means, if necessary also in the form of a third stage, using which an operator can operate the entire plant.

It can be seen therefrom that the overall design is a two-stage system which comprises what is known as the sensor model, which may be provided in the form of a sensor module.

The second component or the second stage of the manufacturing method or of the control apparatus relates to what is known as the process model, which can also be implemented in a separate process module.

Two-Stage Design

Viewed from the perspective of an operator, said person wishes to skillfully set specific machine variables so as to produce a specific product having specific product characteristics as efficiently as possible.

A core aspect of the solution according to the invention consists in identifying a meaningful way of relating machine variables and product characteristics to one another, either to predict product characteristics from particular machine variables, or to identify machine variables by means of which particular product characteristics are to be achieved.

It has been found that it is possible only to a very limited extent, if at all, to directly relate machine variables and product characteristics to one another, inter alia owing to the extremely large number of machine variables and the resulting variations of possible settings.

However, if the underlying process is considered instead of the machine, it is possible to see that a plurality of different manners of setting the machine have similar or identical effects in terms of the process. In addition, the film production process per se can be characterised by significantly fewer numerical values than the state of operation and setting of a specific machine.

If this perspective is taken further, it is evident that it is only the process per se that is relevant for the product characteristics. The decisive factor is the required nature of the film at particular points in the production process (production variables), and not the way in which said nature of the film is achieved by a specific machine.

It is thus possible for the higher-level correlation between
  the machine variables and product characteristics to be structured logically in a correlation between product characteristics and the production variables.
It is thus further possible to establish a correlation between the machine variables and production variables.

In practice, this separation is not entirely meaningful in absolute terms. For example, as mentioned at the outset, it is difficult, but not entirely impossible, to indeed relate machine variables and product characteristics to one another at points. For this reason, it is more expedient to formulate the second correlation as one between the machine variables and process variables, but having a significant focus on production variables as a subset of the process variables.

The solution according to the invention contains logical structuring of this kind, in the form of:
  a process model as a correlation between the product characteristics and production variables a sensor model as a correlation between the machine variables and process variables, having a focus on the production variables.

This results in the above-mentioned two-stage nature of the system.

Process Model

The process model stage relates the product characteristics to the production variables: Specific product characteristics can be achieved by means of specific production variables. At this level, the machine variables are irrelevant; the process model does not need to know said variables in order to carry out its function. All the process variables are independent of a specific machine and merely describe the process that is executed on said machine.

Sensor Model

The sensor model stage relates the process variables, i.e. both the product characteristics and the production variables, to the machine variables: Specific process variables can be achieved by means of specific machine variables. In this case, the focus is on associating production variables with machine variables.

Both stages operate bidirectionally: Product characteristics can be derived from production variables, and vice versa. Process variables, i.e. both product characteristics and production variables, can be derived from machine variables, and vice versa.

Said two-stage design makes it significantly easier, or even makes it possible, at points, to derive product characteristics from machine variables.

Any desired methods can be used to implement the two stages, for example machine learning algorithms, model calculations, optimisation processes, databases, mapping (for example also in the form of a lookup table, etc.), simple operations, or optimisation algorithms and future processes.

Advantages of the Solution According to the Invention

The solution according to the invention is associated with significant and surprising advantages.

The two-stage design of the control apparatus, using a machine-dependent sensor model and a product-dependent process model, makes it possible to dramatically simplify a plurality of setting steps in order for it to be possible to more easily transfer the manufacture of specific plastics films to different plants using different machine variables, to carry out new product developments more quickly and more efficiently, and also to swap products more quickly.

In this case, the technical features of the solution according to the invention and the achievable advantages will be explained in more detail with reference to the following embodiments:

Process Visualisation

Figure 11:
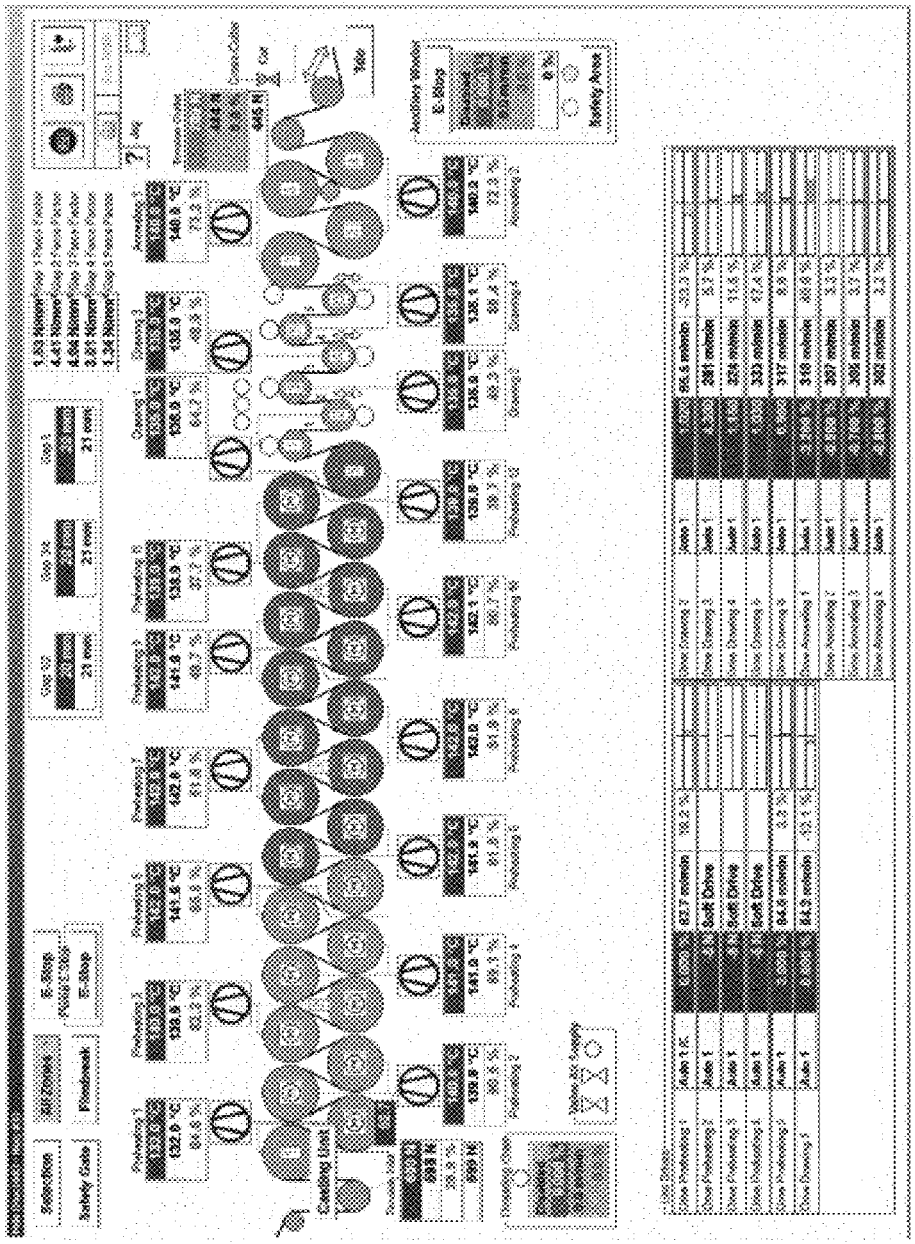
FIG. 11 is a schematic detail of a visualised machine control system according to the prior art.

As has already been explained, within the context of the present invention, the machine visualisation that is known from the prior art and explained with reference to FIGS. 10 and 11 is replaced by process visualisation according to the invention. An example of a detail of a process visualisation system is explained with reference to FIG. 4.

Figure 4:
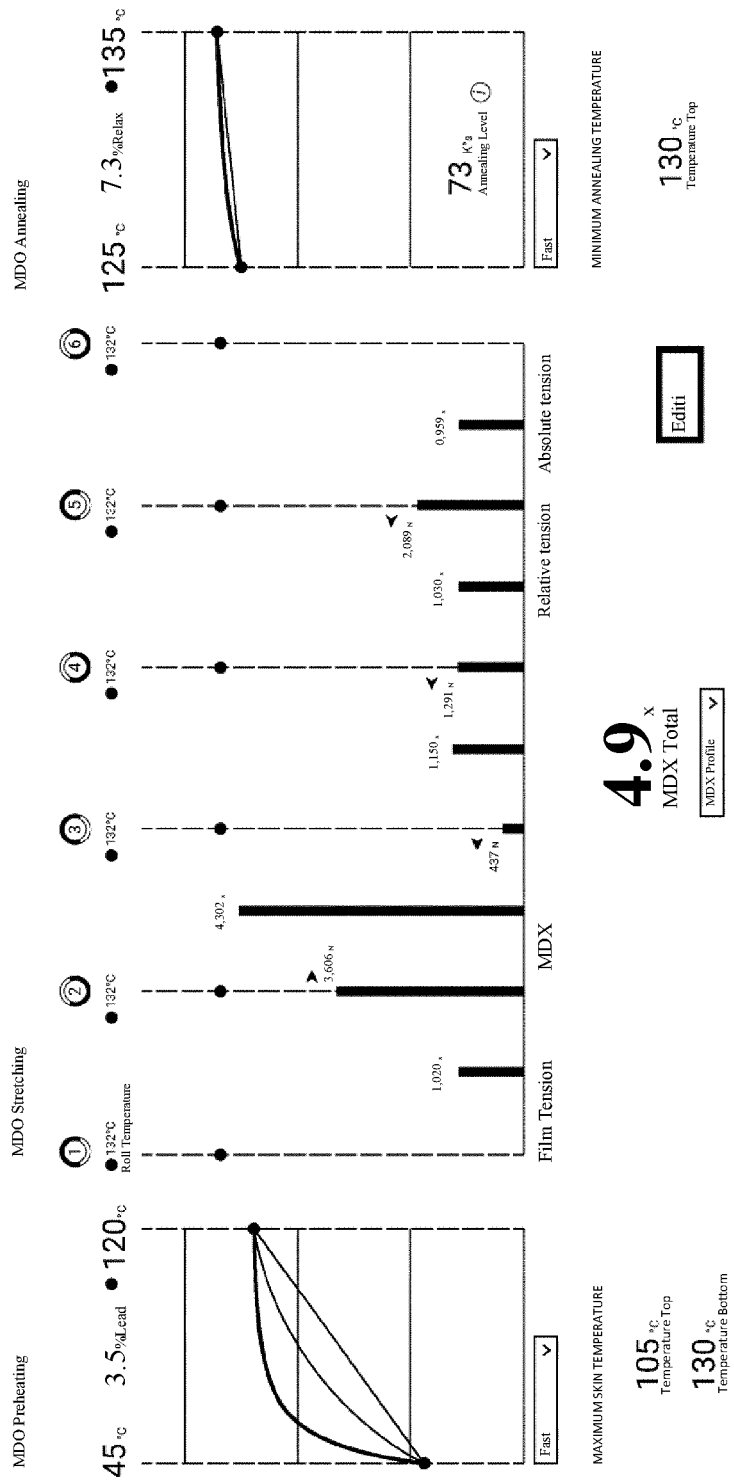
FIG. 4 is an illustration for explaining process visualisation for a lengthwise stretching unit.

FIG. 4 shows, in details, the way in which an operator P can set a change in the fan speed and a change in the zone temperature (in the individual stretching zones) by indirectly setting the film temperature.

In this case, FIG. 4 for example shows six lengthwise stretching stages (for example on an LCD display, as a comparison therewith reference being made in this respect to the machine visualisation shown in FIG. 11 for the lengthwise stretching stage MDO), the film tension being shown in each case as a first bar of a bar chart and, adjacently thereto, the lengthwise stretching forces being shown as a second bar.

The associated roller temperature is shown above, for each stretching stage.

A pre-heating stage, specifically with respect to the lengthwise stretching unit, is shown to the left of the lengthwise stretching stages, the film tensions and lengthwise forces acting on the film web which are shown in the middle.

The infeed temperature of the film in said pre-heating stage is specified as 45° C. The output temperature is intended to be 120° C. The maximum film surface temperature is 105° C. on the upper face and 130° C. on the lower face. The speed difference compared with prior machines is specified as 3.5%.

In the case of indirect setting, mentioned above, the operator sets the film temperature by means of the roller temperatures.

In the case of direct setting, the operator would change the film temperature directly, while an integrated logics unit undertakes the conversion.

This results in a reduction in the number m (the number m generally having a value of far more than 1000 parameters in the case of a machine control system according to the prior art), and therefore ultimately only 10 to 100 (page 8, line 22 specifies the lower limit as 10) variables still have to be set, i.e. for example approximately 50 setting parameters are available.

A design of this kind also makes it possible to implement what are known as assistants for example.

Therefore, if an operator wishes to amend specific process variables for the plastics film that is to be produced, a software-controlled assistant program can submit proposals of how best to amend which parameters in order to achieve a desired aim.

Therefore, this is possible only because, as explained, the overall control method, comprising the machine-dependent sensor model and the product-dependent process model that builds thereon, is designed so as to be two-stage, and therefore no considerations regarding the sensor model are necessary for the process control itself. This is because said machine-dependent data are stored in the two-stage model quasi as a "foundation" and are accordingly set automatically owing to the bidirectional association between the process variables and the machine variables.

In this case, it should also be noted at this point that the transfer functions, i.e. the ratios between the machine variables and production variables of the sensor model, can be stored on the basis of mathematical formulae and/or relations or, in the simplest case, also in the form of lookup tables which link specific machine variables to specific process variables.

The entirety of the complex logics for converting machine variables into process variables and ultimately product characteristics is undertaken by models (sensor model and production model) and remains hidden from the operator.

In this case, in a preferred embodiment of the invention, which will be discussed in the following, the ratios between the machine variables and process variables for individual segments of the manufacturing process are stored separately because the plastics film to be manufactured or processed exhibits different temperature curves, different thickness profiles and different turbidities having a different turbidity level (haze) in the individual stages or segments (depositing of the cast film onto the chill roll, heat pre-treatment, lengthwise stretching, transverse stretching, post-treatment, etc.), and in this case different lengthwise and/or transverse stretching forces act or are intended to act on the film in the individual segments, according to the specific production and/or treatment stage.

Transferability of the Plant Setting and/or Comparability of the Setting in Two Different Film Manufacturing Plants If, for example, a specific plastics film is tested, using specific starting materials and specific different film layers, etc., on a smaller plant, such as a laboratory plant and is then intended to be manufactured on a large production plant, it has hitherto been necessary, according to the prior art, to set all the setting values, and thus all the machine variables, again, on the large plant, using machine visualisation, until, owing to complex iterative setting steps, the plastics film is finally manufactured having precisely the product characteristics intended.

Now, within the context of the two-stage control apparatus according to the invention and/or the two-stage control and/or manufacturing method, when shifting the production from a smaller plant to a larger plant the now very different machine variables are adjusted not by means of machine settings (the operating personnel no longer has to consider said machine settings) but instead merely by what is known as the process model.

This means that the film characteristics are in turn set, on the process model, by means of the various stages or segments, i.e. individual steps of the manufacturing process, in such a way that the film ultimately manufactured thus exhibits the desired product characteristics.

On the basis thereof, the process model assigns the corresponding production variables to the individual manufacturing phases (correlates the corresponding production variables), which variables are then in turn correlated, by means of the sensor model and according to the plant, with machine variables which are accordingly set automatically.

Even the transfer of production conditions (setting) between similar plants has hitherto been very difficult according to the prior art, because there are often usually small, but very significant, deviations from plant to plant. The more pronounced the deviations, the more problematic the transfer from one plant, comprising set machine values found to be optimal, to another plant similar per se has hitherto been.

The plant or control means according to the invention makes available production variables derived by the sensor model, for example the film temperature or the film traction, which variables are thus derived and/or abstracted from machine variables. Said process-relevant variables (production variables) which are machine-based or machine-dependent but abstracted from the machine variables can then be directly adopted by any other plant which executes the same process and by means of which an identical film having identical production characteristics is intended to be manufactured. It is then necessary only to set, on said different plant, the product characteristics of the final manufactured film, and thus the process variables, in accordance with the process model used therein, in order to thus finally carry out the exact machine setting by means of the bidirectional process model and the sensor model that is dependent thereon as a substage.

If a plurality of plants of the same raw material type are equipped with the system according to the invention, the transfer of settings between said plants can be significantly simplified.

Quick and Efficient Product Development

If, for example, a plastics film having specific product characteristics is intended to be manufactured on an already installed film manufacturing plant, according to the prior art this has hitherto required a plurality of settings for primarily mechatronic components.

In the case of the control apparatus according to the invention that is described, this is achieved by means of direct setting of the final product characteristics of the finished plastics film. The setting values dependent thereon, for example for the mechatronic components of the plant itself, are then achieved automatically and in a system-assisted manner, specifically using the stored two-stage setting model comprising a product-dependent process module as one stage and the machine-dependent sensor module as the second stage, the process model, using the stored transfer function or relation, in turn correlates the production variables, such as the film temperature, film tension, and lengthwise and transverse stretching forces, with the process variables of the plastics film to be manufactured, i.e. for example the thickness of the film, the shrinkage of the film, the E-modulus, the turbidity of the film (haze), etc. In this case, said process variables in turn correlate, in the individual stages for manufacturing the plastics film, with the final product characteristics of the final and completed manufactured plastics film.

The two-stage design, according to the invention, of the control system in addition also allows the operating personnel to not only set or amend product characteristics very quickly and easily, but to also check specific process-relevant intermediate results, specifically for example in the context of "what-if" scenarios. It is thus possible to predict rapidly changing final characteristics, on the basis of different process variables.

Knowledge of the qualitative and quantitative dependencies between the product and production variables (production model) makes it possible to quickly set the plant, proceeding from new product variables. At the current outputs of over 7.5 t/h, new developments of films can be achieved efficiently only by applying a process model.

Proceeding from fixed product characteristics, a process model specifies the production variables necessary therefor by means of suitable methods, such as machine learning algorithms.

This step describes all the process variables and thus the entire film production process.

Suitable sensor models adjusted to the specific production plant then determine which machine variables are required for achieving the particular process variables. In the simplest case, this may simply be an association; for example, the relative speed difference between two drives, which can be set at the machine level, corresponds to the MD stretching ratio in the MDO stretching frame.

However, usually comprehensive calculations are required, in combination with optimisation algorithms, in order to find suitable machine variables. Said machine variables are then automatically transferred into a pre-existing plant control system, for example one or more programmable logic controllers, and made effective in an appropriate manner. Settings that cannot be made automatically are indicated to the user in an appropriate manner, so that said user can carry out the setting manually.

Thus, ultimately, all the components of a plant are set to the machine variables determined by the system.

Since both models operate in a bidirectional manner, at least the production variables, and possibly also isolated product characteristics, can be determined from the machine variables by means of the sensor model. All of the product characteristics that are still missing after this step can then be specified by the process model.

It is thus possible to predict product characteristics on the basis of the change in machine variables. This applies not only for machine settings, but also for measured values, for example the ambient temperature.

Quick Product Swap

The product swap is a recurring procedure that takes place on a production plant every 10 hours to approximately 2 days. In the case of the ever higher outputs, carrying out the product swap efficiently can be the decisive factor for the success or failure of a company. Using the concept described, the product swap is guided by an assistant, and at the same time the machine is set purposefully by means of the sensor and process model. Specific settings should already be implementable without machine learning. An "intelligent plant" can, assisted by suitable systems, reach the optimal operating point for specific characteristics. In the process, it is also possible to define what is meant by an optimal operating point.

Improved Process Understanding

Within the context of the invention, the system-assisted specification of production variables additionally makes the underlying process significantly more transparent for the operating personnel than was previously the case in simply assessing the machine settings according to the prior art.

Quicker Causal Analysis in the Case of Quality Variations

Reducing the m machine variables to n process variables (which is possible, within the context of the invention, only due to the two-stage process design, using a sensor model comprising machine-dependent machine variables) makes it possible for the causal analysis to be carried out more quickly and in a more targeted manner in the case of deviating product characteristics.

Optimisation of the Production

There are many possible ways of achieving specific product characteristics. The control apparatus according to the invention and/or the method according to the invention can, assisted by suitable systems, help with reaching the optimal operating point for specific characteristics. In the process, it is also possible to define what is meant by an optimal operating point.

Sensor Module and/or Sensor Model

The manner in which a specific sensor module can be implemented will be described in the following, by way of example.

In this case, the following explanation will clarify, for example for the "film temperature calculation", the relation that exists between the machine variables and production variables with respect to the mentioned film temperature that is to be set.

In the case of film production plants that operate using the material polypropylene, it is possible to calculate the temperature of the film web at positions within the plant that are important for the process. This applies for sequential and simultaneous film manufacturing plants.

For this purpose, the plant is divided logically into segments, starting at the exit lip of the melt die, specifically precisely in such a way that boundary conditions that are constant from the perspective of the film web prevail in each plant segment. This applies in particular with respect to:
    heat transfer coefficients between the film and the machine or surroundings
    machine or ambient temperatures.

The dwell time and the thickness of the film web is calculated for each plant segment, on the basis of the plant speed in said segment. Furthermore, thermal material properties, the material throughput, and the temperature of the plastics melt are also available as input variables.

Starting at the first segment, using the melt temperature as the starting temperature and input temperature for the first segment, the temperature change across the segment is calculated by means of a suitable algorithm. All the above-mentioned values are included in said calculation:
    heat transfer coefficients between the film and the machine or surroundings (physical variable)
    machine or ambient temperatures (controlled or measured)
    dwell time (from speed)
    thickness of the film web (inter alia from speed)
    thermal material properties (density, thermal capacity, thermal conductivity)
    material throughput (from material feed)
    input temperature of the segment (from previous segment/melt temperature)

The film temperature at the end of each plant segment is transferred, as the input temperature, to the immediately following segment. The segmented processing thus allows calculation inter alia for positions that are important for the process.

The calculation is made in accordance with the Binder-Schmidt, FEM models or Fourier method, or in accordance with other suitable methods.

In principle, the calculation could be carried out without the material throughput, but specifying this makes it possible to also calculate the heat flow between the film and the machine/surroundings, such that statements can be made regarding the energy requirement of the process.

It is thus possible to establish a correlation between a machine variable that is to be set, e.g. for the temperature, and a film temperature that is actually determined thereby. Said correlation conditions apply bidirectionally. In other words, if a specific film temperature is set, then a specific machine variable would also be correspondingly adjusted thereby in order to generate said temperature. If, vice versa, a temperature value is changed on the machine variable, this leads, according to the correlation conditions or the transfer function, to a modified value with respect to the film temperature.

However, said correlations or transfer functions are not set for the entire multi-stage process for manufacturing a plastics film web (although this is exactly the case for the one-stage process for manufacturing a cast film for example), but instead are set in a segment-dependent manner. As already mentioned, the entire film manufacturing plant is divided, in the draw-off direction, into a plurality of plant segments or plant zones, each segment being characterised in that measurable or calculable conditions prevail there, i.e. for example, as set out, the same heat transfer coefficients between the film and the machine or surroundings, and the same machine or ambient temperatures.

Therefore, being subunits that can be handled uniformly, said segments that may comprise a plurality of individual heating stages, fans, etc. can be treated as plant segments.

For the mutually successive segments through which the plastics films to be manufactured pass in succession, the film temperature values optimised for a specific plastics film can then be calculated in each case, which values are correlated with corresponding machine variables.

In addition to simply calculating a process value that is derived and thus abstracted from the machine variables, this also allows for considerable simplification of the overall machine settings.

In the case of a conventional film manufacturing plant, the machine settings for film pre-heating in the furnace of a transverse stretching or simultaneous plant comprise approximately 6 to 8 air temperatures and approximately 20 to 30 fan speeds, the settings of which are furthermore dependent on the film thickness and the plant speed.

However, the same film pre-heating can also be described merely by the final temperature of the film, possibly also supplemented by the starting temperature and a simple curve of the temperature progression over the dwell time.

A significant simplification and/or dimensionality reduction thus takes place with respect to the process model and the machine learning algorithms possibly used therein. As a result, machine-independent tasks can be handled far more easily.

An entire method step can be specified on the basis of just a few setting values.

The manner in which specific temperature process values can ultimately be generated, on the basis of the particular plant-specific correlations or transfer functions, quasi unidirectionally from machine variables (for example a setting value for a temperature on the machine) has thus been explained above, specifically preferably for a plurality of plant segments or plant zones that are provided and/or defined or arranged consecutively in the draw-off direction of the plastics film web.

However, the correlation or derivation between machine variables and process variables is not only unidirectional, but also bidirectional, and therefore related machine variables can accordingly be defined, in a manner dependent on specified process variables, again preferably separately for each plant segment or each plant zone through which the plastics film passes successively. This will be explained briefly in the following, with reference to a few illustrations, for example for producing a cast film.

When producing a cast film, the melt is deposited from a slot die (via a die lip) onto a chill roll that is at a specified temperature. In the case of some types of film, the chill roll may be located in a water bath. During rotation, the cast film delivered by the slot die optionally passes through the water bath and is generally lifted, after a wrap angle of more than 180°, and fed to a following roller.

The water bath is at a specified temperature, as is the surface of the chill roll.

Figures 5, 6:
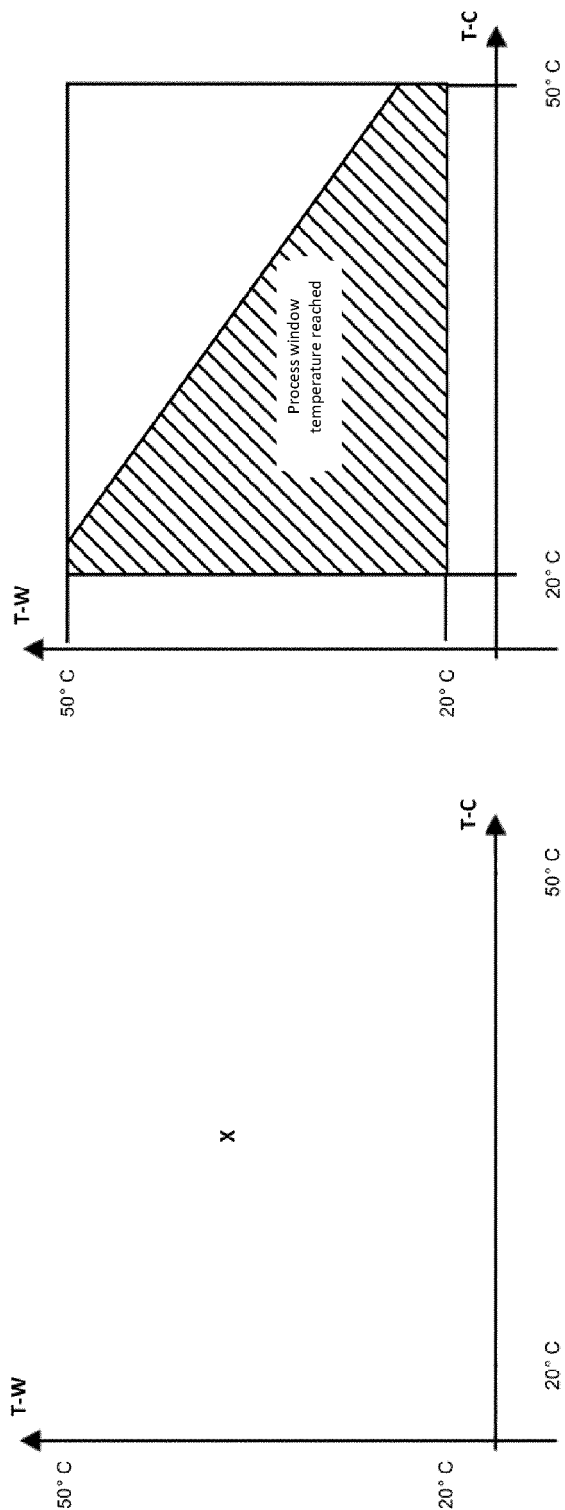
FIG. 5 is a first drawing to illustrate an optimisation process with respect to a water bath temperature and a chill roll surface temperature.
FIG. 6 is an illustration comparable to FIG. 5 for explaining the optimisation process.

As shown in FIG. 5, the chill roll may be at a temperature T-C, specified on the X-axis, and the water bath may be at a water bath temperature T-W, specified on the Y-axis. A cross X can be seen in said figure, which is intended to reflect an optimal temperature T-X with respect to the roller surface of the chill roll and the temperature of the water. In the example shown, the optimal surface temperature of the roller is intended to be 35° C. and the optimal water temperature 40° C. Ultimately, however, any value between the lower and upper limits of 20° C. and 50° C., respectively, given for the chill roll surface temperature, or between 20° C. and 50° C. for the water bath temperature, would be conceivable.

However, there are also optimal values within this range; in other words, not every value within the square or rectangle thus formed is equally effective.

The question now is how it may be possible to determine the best possible temperature range for the surface roller temperature of the chill roll and for the water temperature.

Any conceivable methods can be used for this purpose, in order to ultimately make it possible to conclude optimised machine variables from specific process variables such as the cast film temperature.

One of the optimisation methods that may be carried out is based on an optimisation algorithm that functions according to the principle of intelligent testing.

Said optimisation algorithm can be based on any desired function and can specify optimal parameters for said function. In the case of the sensor model for the film temperature, said algorithm is based on the above-mentioned film temperature calculation and thus determines optimal machine settings.

Since the algorithm can ultimately be based on any desired function, i.e. thus takes a universal approach, it is possible to expand an essentially unidirectional calculation to a bidirectional model. In this case, this can be used not only for sensor models but in principle also for process models.

In order to facilitate understanding of a principle of the optimisation algorithm, reference is made in the following to FIG. 6. In the example described above of an optimised water bath temperature and an optimised roller surface temperature, this is ultimately a two-dimensional space, it being clear in the above-described embodiment with reference to FIG. 5 and the corresponding illustration according to FIG. 6 that a more optimal temperature range T-W for the water bath and a more optimal temperature range T-C for the chill roll would be in the rectangle (or square) shown in FIG. 6 below the trendline that falls away to the right.

Description of an Algorithm

Figure 7:
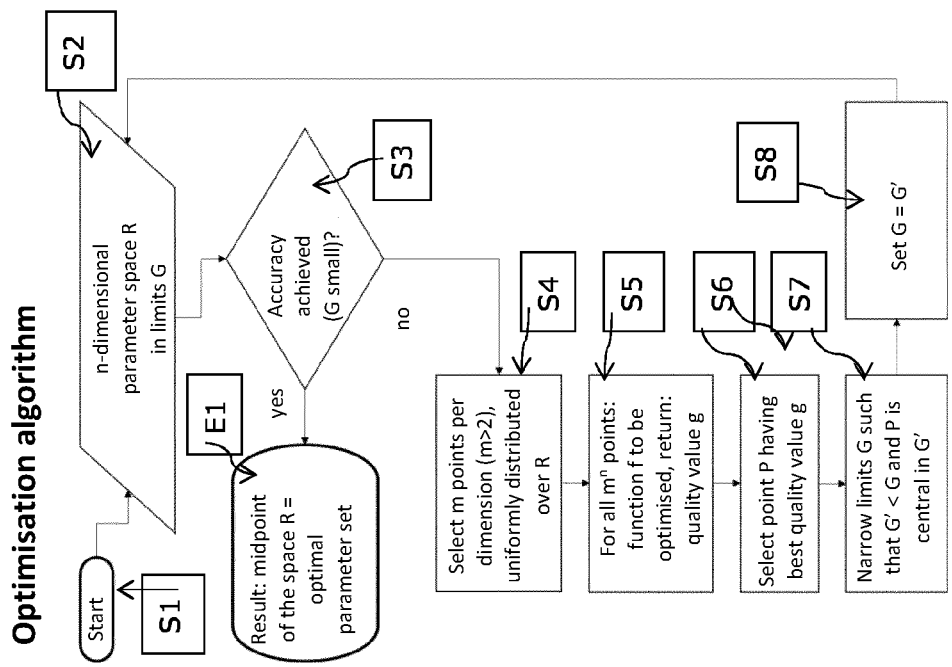

According to the optimisation algorithm shown in FIG. 7, a two-dimensional parameter space R of this kind is assumed, specifically within the limits G of 20° C. to 50° C. for the roller surface temperature T-C and also, in this example, for the in this respect identical temperature values of 20° C. and 50° C. for the water bath temperature, T-W. In the optimisation algorithm according to FIG. 7, the term "Start" (S1) denotes the beginning of the algorithm.

In the two-dimensional parameter space R (n=2) mentioned, a value is selected and then checked (S2) with regard to whether the achieved accuracy is sufficient, i.e. the threshold values are low enough (in the embodiment shown, it is assumed that any temperature value between 20° C. and 50° C. would be optimal).

If, following method step S3, the accuracy is assessed as sufficient (i.e. the space between the upper and lower limit for the two temperature values of the roller surface on the one hand, and the water temperature on the other hand), the midpoint of said two-dimensional parameter space R is preferably used as the optimal parameter set E3.

The result E1 would then be fixed.

If, in step S3, the accuracy is assessed as not low enough, for example more than two points, in general m points in the n-dimensional parameter space R, would be selected, i.e. two points in the present space, which would be within the two-dimensional space in FIG. 6 (S4). A function f to be optimised is implemented for all $m^n$ points, a quality value g being maintained (S5).

Next, the point P that corresponds to the best quality value g is selected (S6).

Subsequently, the limits are narrowed, i.e. for example the lower limit is raised from 20° C. to 30° C. and the upper limit is lowered from 50° C. to 40° C., etc., and then a point P reflecting the optimal value is again determined in this reduced range, which point is located centrally between the narrowed limits G' (S7).

Subsequently, said newly selected middle value G' is used as the starting point 4G (S8) and the loop is performed again, as illustrated in the drawing according to FIG. 7.

Figure 8:
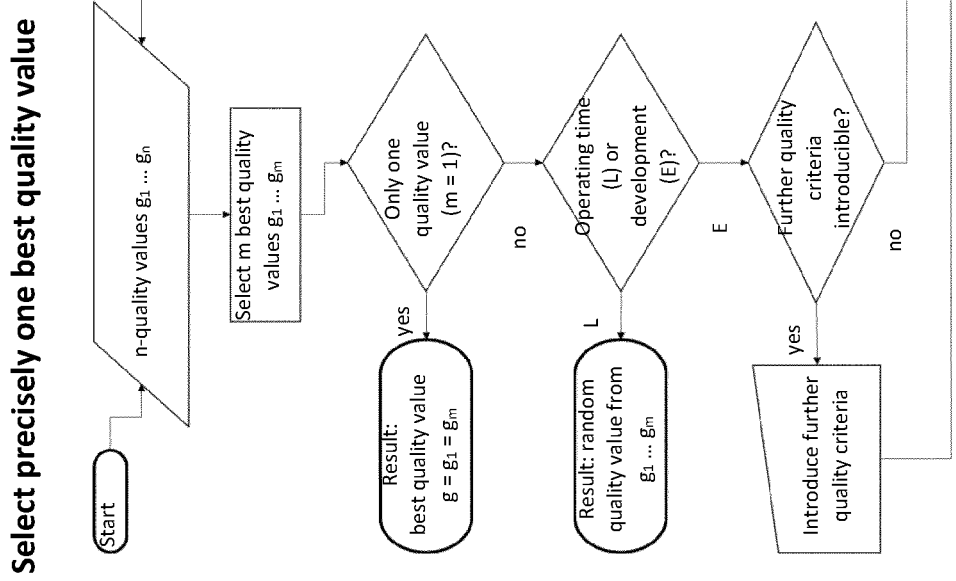
FIG. 7-9 are flow diagrams, by way of example, for optimisation algorithms.

The drawing according to FIG. 8 explains, in a simplified manner, the exact way in which the best quality value can be determined.

The essential factor in this case is the distinction between the operating time of the system, i.e. the system is in use productively, and the development of the system, i.e. the system is, for example, adjusted to a specific machine, within the context of the development of a sensor module, or is adjusted to a specific process, within the context of the development of a process module.

If the situation arises, during the operating time, that the optimisation algorithm returns a plurality of equally optimal quality values, one quality value is selected at random from this set.

If this situation arises during the development time of the system, further quality criteria have to be introduced until the optimisation algorithm returns precisely one quality value.

Figure 9:
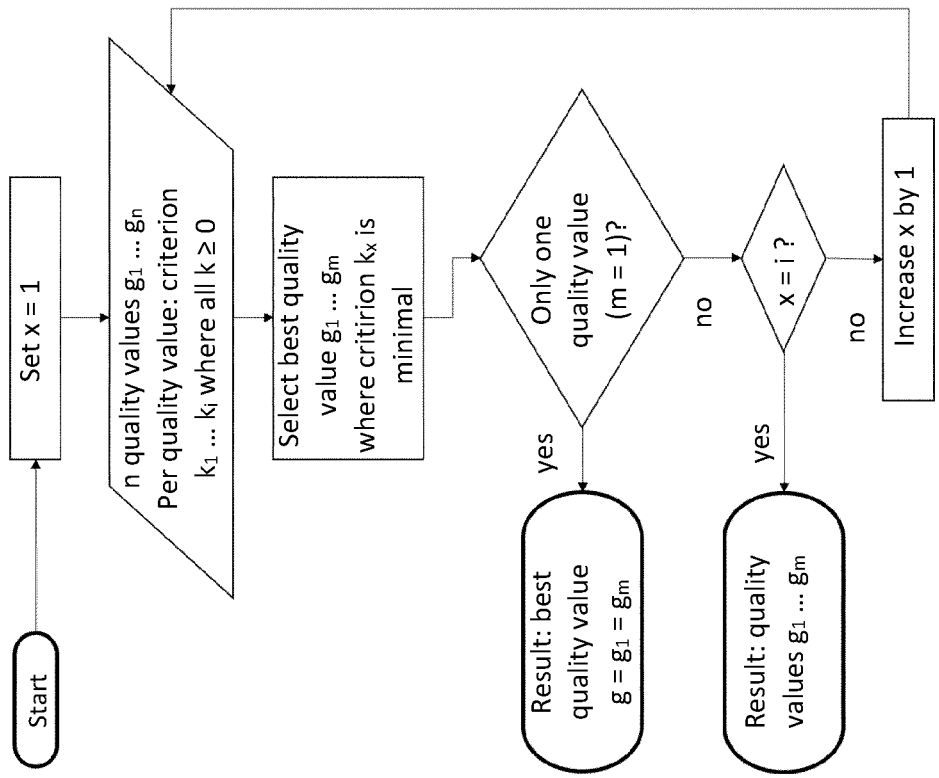

The drawing according to FIG. 9 shows an example of how a plurality of the best quality values can be determined.

In this case, each quality value is characterised by i criteria $k_1 \ldots k_i$, said criteria being numerical values greater than or equal to 0. The better a quality value, the lower the numerical value. Furthermore, the lower the $index_x$ of a criterion $k_x$, the higher the priority of said criterion.

Beginning with the criterion having the highest priority $k_1$, the aim of the determination is then to determine the best quality values $g_1$ to $g_m$ and to restrict this set of quality values by stepwise consideration of the criteria of increasingly low priority. Ideally, this results in restriction to precisely one quality value g, but it is also possible for all criteria to have been considered and for a set of quality values $g_1$ to $g_m$ to still be considered optimal.

If a plurality of quality values is returned here, this situation has to be intercepted during the operating time of the system and/or further criteria have to be defined at the time of development of the system (see above).

Process Module and/or Process Model

Explanations regarding the sensor module and/or sensor model have been made above.

In the following, the process module and/or process model will be discussed.

A process model provides the association between the production variables of ongoing or hypothetical production and the product characteristics of the product created by means of said production. Said model thus reproduces a significant part of a production process, specifically such that machine processing of said reproduction is possible, in particular using information technology systems.

The process model is in addition abstracted from a specific plant and can be transferred, without substantial changes, to any plant having a sensor model that supports said process model.

Determination of the Product Characteristics

From the perspective of the product characteristics, the process model makes statements regarding which product characteristics are achieved by means of a specific process. In other words, this means that statements are made regarding "what", i.e. what is produced.

Example: The process model for the process of "biaxial stretching of polypropylene film" states that the produced films will have a tensile strength of 200 MPa in the machine direction. This value for the tensile strength can also be referred to as "MD tensile strength".

Determination of the Production Variables

From the perspective of the production variables, the process model makes statements regarding which production variables are required for a specific process and the range in which they may be varied, if applicable. In other words, this means that statements are made regarding "how", i.e. how production is carried out.

Example: The process model for the process of "biaxial stretching of polypropylene film" states that a film is stretched by a factor of 4.5 in the machine direction ("lengthwise"), values between 3.5 and 5 being permissible for the specific process. Furthermore, the temperature of the film must be 130° C., and in this case an adjustment range of 128 to 132° C. is permitted.

This factor can be referred to as the "MD stretching ratio". The film temperature is referred to inter alia as "film temperature before MD stretching".

Association

The process model associates production variables and product characteristics by means of suitable methods, e.g. machine learning algorithms. In other words, this means that, within the context of said process model, the "what" is associated with the "how", i.e. in other words what is produced how.

This association is carried out bidirectionally. In this case, which production variables are influential to what extent is also specified, explicitly or implicitly.

Example: The process model for the process of "biaxial stretching of polypropylene film" states that a film that is stretched by a factor of 4.5 in the machine direction ("lengthwise") and has a temperature, in the process, of 130° C., will have a tensile strength of 200 MPa.

Vice versa, the process model states that, in order to achieve a tensile strength of 200 MPa, the film has to be stretched in the machine direction by a factor of 4.5, at a film temperature of 130° C.

Abstraction from a Specific Plant

From the perspective of the process model, the way in which a machine needs to be equipped and set in order for specific production variables to be provided and specific product characteristics to be achieved is irrelevant.

Example: The way in which the above-mentioned film temperature of 130° C. is reached is irrelevant. This may be achieved by transporting the film over heated rollers, by guiding the film past suitable infrared radiators, by means of a procedure that is yet to be developed, or by means of a combination of a plurality of procedures. Accordingly, the process model does not relate to the manner in which possible roller temperatures, infrared radiators or other machine parts have to be set.

Delimitation from the Sensor Model

The above-mentioned machine settings, together with measurements made on the machine, are the machine variables. Said variables are related to the process variables (product characteristics and production variables) by means of the sensor model.

Although both the process model and the sensor model depict correlations, in this case the process model is independent of a specific machine, whereas the sensor model is entirely machine-specific, i.e. it usually has to be created specifically for each machine.

Example: The specification as to how the above-mentioned film temperature of 130° C. is achieved on a specific machine originates from the sensor model.

In the case of a machine comprising heated rollers, the sensor model of the machine specifies the roller temperatures at which the film temperature can best be achieved. In the case of a machine comprising infrared radiators, the sensor model of the machine specifies the intensities of the radiators at which the film temperature of 130° C. is to be achieved. In addition to the heated rollers, IR radiators may also be installed.

The two sensor models mentioned differ in principle but, using the process variable of "film temperature", form a coherent interface to a process model that can be based on both sensor models without any adaptation.

Examples and Use Scenarios

A specific process is given which achieves specific product characteristics proceeding from specific production variables. A process model ensures the association between the production variables and the product characteristics.

Said process is executed on a specific plant. The sensor model of said plant provides an association between the process variables of the above-mentioned process and the machine variables of said plant. However, on the process side, the association with the process variables, i.e. the production variables and the product characteristics, is such that an association with production variables results primarily, and an association with product characteristics results only where said characteristics are either identified by measurement technology or are in a simple correlation with machine variables.

Against this background, some examples will be explained that can be carried out in a corresponding control unit using the process module/process model described (which associates the product characteristics of a very specific plastics film with the relevant production variables), which model is based on a sensor module/sensor model (which associates the production variables such as temperature, lengthwise and transverse stretching forces, etc. with the settable machine variables).

Examples for updating the temperatures in the case of a speed increase in the draw-off direction of the plastics film web and in the transverse stretching direction:

A higher speed in the drawing-off direction of the plastics film would ultimately result in a reduction in the dwell time of specific portions of the plastics film in the heating or cooling phases or zones provided. The film temperature would therefore change. It is therefore usually necessary, in such cases, to adjust the temperature setting, as a result of which the speed increase makes it possible to compensate for the temperature drop (in the case of a shorter dwell time in a heating zone). As explained within the context of the present invention, an "intelligent control apparatus" could carry out the desired temperature adjustment automatically, i.e. update the corresponding temperature setting automatically to the optimal value.

Semi-automatic implementation would also be possible, according to which the control apparatus according to the invention submits a proposal (which is shown on the display of the visualised process control system) in order to then allow the operator the freedom to manually amend or carry out the corresponding settings.

Energy-Efficient Adjustment of the Pre-Heating in a Transverse Stretching Zone (TDO):

In the following, a possible feedback control portion will be discussed, which relates to the achievement of the production characteristic of "film temperature" before lateral stretching, i.e. following pre-heating in the furnace (TDO). Said film temperature is related, by means of a sensor model, to the air temperatures and fan speeds set in the pre-heating zone. At this point, the film temperature will be considered to be fixed; the decisive factor in this scenario is the machine variables by means of which the sensor model achieves said film temperature.

In this case, the corresponding adjustment can be carried out in two manners for example, specifically by means of
increasing the temperatures, and/or
increasing the fan speed (as a result of which a larger amount of hot air can be supplied).

The problem is therefore that of identifying which manner may be the better in the two optional solutions, i.e.:
selecting higher fan speeds at moderate air temperatures, in order to in the process increase the heat transfer between the hot furnace air and the film, but resulting in a high electrical power consumption together with a low thermal power consumption, and/or
favouring higher temperatures, and in the process possibly reducing the fan speeds, which is associated with a rather lower electrical but higher thermal power consumption.

In this case, it is possible, within the context of the control apparatus according to the invention, to determine what temperatures and what fan speeds are the most energy-efficient.

Quality Optimisation of the Film Characteristic of "Tensile Strength of the Film" (MD Tensile Strength)

If an operator wishes, for example, to increase the tensile strength in the case of a specified process, said operator can set the desired increase in the corresponding operating terminal in the form of the visualisation of the sensor and process module. The product characteristic of the film tensile strength is thus increased, for example from 200 MPa to 220 MPa.

The process model then determines new production variables in order to achieve said product characteristic. The tensile strength can theoretically be influenced by the production variables of "film temperature during stretching" and/or "MD stretching ratio". Using a suitable algorithm, the system for example determines a decrease in the film temperature from 130 to 129° C. and an increase in the stretching ratio from 4.5 to 4.7.

As a result, the production variables "film temperature during stretching" and "MD stretching ratio" have changed.

The sensor model of the plant then determines how the new film temperature can be achieved, by setting the following machine variables: chill roll temperature, water bath temperature, chill roll speed, and ten temperatures of the MDO pre-heating rollers. The melt temperature and the cast film thickness are used as the measured values.

The optimal settings can be determined for example by means of an optimisation algorithm, which minimises the energy requirement of the process as a secondary condition. Said minimisation of the energy requirement is particularly easily possible here because a cooling process is immediately followed by a heating process.

Moreover, the sensor model determines the new drive settings that result from the increase in the stretching ratio. This is a simple calculation, and in the case of some plants even simply a 1:1 assignment of the stretching ratio to a speed factor of a drive.

Quality Optimisation of the Film Characteristic of "Haze" (Turbidity)

If an operator wishes, during a specified process, to produce an optically clearer film for example, in the system described, i.e. the control apparatus according to the invention, said operator would then change the value relating to the production characteristic of "haze" (level of the turbidity of the film) for example from 3% to 1.5%.

The process model then determines new production variables in order to achieve said product characteristic. Said product characteristic can theoretically be influenced by the production variables of "film temperature after the casting unit" (i.e. the chill roll unit to which the molten film is transferred from the slot die) and/or "MD stretching ratio" (i.e. the stretching ratio in the length direction of the machine). However, it is not desirable to change the lengthwise stretching ratio MD because it has barely any influence and the plant speed is intended to remain constant. Using a suitable algorithm, the system now for example determines a reduction in the film temperature (after the chill roll unit) from 60 to 50° C. The lengthwise stretching ratio MD remains unchanged.

As a result, the production variable of "film temperature after the chill unit (casting unit)" has changed. The casting unit is mentioned here as an influencing process portion only as an example; raw material parameters, formulations and annealing temperatures, etc. are more influential.

The sensor model of the plant then determines how the new film temperature can be achieved, by possibly setting the following machine variables: chill roll temperature, water bath temperature and chill roll speed. The melt temperature and the cast film thickness are used as the measured values. However, of the possible settings, the chill roll speed is intended to remain constant because it has a direct influence on the overall plant speed.

The optimal settings can be determined for example by means of an optimisation algorithm, which minimises the energy requirement of the process as a secondary condition.

Reduction in the Changeover Times During a Product Swap

It is assumed in the following that an operator of the plant wishes to produce thicker films in a process. For this purpose, said operator increases the product characteristic of "finished film thickness" in a suitable system, for example from 20 to 25 μm.

Put simply, said product characteristic is independent of all production variables with the exception of the cast film thickness. The process remains unchanged; just the film is made thicker.

At the level of the sensor model, the "chill roll speed" must then be reduced and/or the machine variable of "extruder output" must be increased. Since an increase in the output is preferable to a reduction in the speed, the sensor model increases the extruder output from for example 4000 to 5000 kg/h.

However, it is also evident that the production variables of lengthwise stretching temperature (MDO) and transverse stretching temperature (TDO) can no longer be achieved at the increased film thickness and the specified temperature settings. Furthermore, the cast film would be too hot, i.e. the production variable of "cast film temperature" would be too high.

The sensor model reacts thereto by adjusting the following machine settings: chill roll temperature, water bath temperature, MDO roller temperatures, TDO temperatures and fan speeds. The melt temperature and the anticipated cast film thickness are used as the measured values.

These settings are optimised such that the original production variables are achieved again.

In this case, it is important to note that the entire changeover can be considered in the form of a "what-if" scenario, i.e. the sensor model can predict which production variables would be affected by increasing the output and can calculate the suitable machine settings therefor in advance. When all the values have been calculated, the machine settings can be changed for example in small steps, until the new settings are achieved.

Transfer of Plant Settings Between Similar Plants

It is assumed in the following that an operator of the plant wishes to manufacture a new product, i.e. a new plastics film or cast film, which he has tested on a different plant and which he now wishes to manufacture on a plant that is different from the testing plant. However, the plastics film production plants are not identical, but instead differ from one another in small but significant details. A 1:1 transfer of all the machine settings is therefore not readily possible.

For this purpose, the operating personnel are therefore not required to transfer any machine settings, but instead merely the process variables, from plant A to plant B. In this case, it is left to the sensor model of plant B to identify suitable machine variables for said process variables. In a manner similar to the above-mentioned optimisation or changeover scenarios, this can also take place using suitable optimisation algorithms which may likewise take account of specific boundary conditions such as the energy requirement.

Owing to the computation time that, in optimisation algorithms, usually increases sharply as the number of parameters increases, it may be necessary to use quicker calculation models or possibly tables for assistance, although the procedure at the level of the sensor model is in principle comparable to one of the above-mentioned quality optimisation procedures. The difference is merely that it is necessary to identify suitable machine variables not merely for comparatively few process variables, but instead for all the process variables.

Assuming properly functioning sensor models and extensive similarities between the two plants, the sensor model of plant B should identify machine settings that are relatively similar to those of plant A.

Transfer from a Smaller Laboratory Plant to a Larger Production Plant (Upscaling)

It is assumed in the following that a new product that was previously tested on a laboratory plant is intended to be produced by means of a plant. The corresponding settings for the larger production plant now have to be identified by means of producing the product that was previously tested on a smaller plant; therefore, in this respect, this is what is known as upscaling of a corresponding process.

The principle approach in upscaling is no different, for the system, from a transfer of plant settings between similar plants. In this case, the abstraction of the process is particularly important: it is highly likely that the sensor model of the production plant will identify significantly different machine settings from the sensor model of the laboratory plant. However, the process is the same, and therefore the process variables can be transferred, unchanged, from the laboratory plant to the production plant in this case too.

Assistance Systems

The control apparatus according to the invention, comprising a sensor module and a process module that can be accommodated in common hardware or can for example also be separated, in terms of hardware, into a sensor module and a process module and can be combined as desired, is also suitable, owing to the microprocessor-controlled overall structure and design of the switching means, for now implementing specific assistance systems.

If a specific change, such as described above, is intended to be made on a plant or in the event of a changeover on the plant, etc., the control apparatus can thus identify the corresponding machine values in an automatic or semi-automatic manner (within the context of a proposal), or the assistance system guides the operating personnel, step-by-step, in the changes to be made, by means of specific proposals being submitted which can then be accepted, resulting in the corresponding values being set.

However, if necessary, said assistance systems can also submit different proposals, for example regarding whether the corresponding production process having a high energy consumption is intended to be carried out in a more energy-efficient manner, thus saving energy. Accordingly, the control apparatus according to the invention identifies different preferred setting values for the machine variables.

As described, in this case, the operating personnel have to deal with only the plastics film that is actually to be manufactured in each case, because the process variables are ultimately derived from the product characteristics of said film and the machine variables can then ultimately be correctly set using the associated process model and the sensor model that is located therebelow.

The invention claimed is:

1. A control apparatus for setting settable machine variables of a machine used in manufacturing plastics flat sheet films, cast films, monoaxially, uniaxially, sequentially biaxially or simultaneously biaxially stretched plastics films, or for manufacturing blown films, including double-bubble films, tri-bubble films or multi-bubble films, the control apparatus being designed to be at least two-stage, the control apparatus comprising at least one processor configured to provide structure comprising:
a machine-dependent sensor model connected to a plurality of sensors, the sensor model qualitatively and quantitatively establishing a link between machine variables and process variables, wherein the machine variables are characteristics of the machine and the process variables are characteristics of material to be processed by the machine;
a production-dependent process model that qualitatively and quantitatively establishes a link between production variables and product characteristics, wherein the production variables are process variables that describe a production process and the product characteristics are process variables that describe a final product;
the machine-dependent sensor model and the production-dependent process model being mutually associated by production variables,
the sensor model linking or associating settable machine variables with production variables on the machine side,
the settable machine variables including one or more machine variables from the group consisting of cooling water temperature, heating temperature of heating systems, fan speeds of ventilators, and tensile stresses in the transverse and/or length direction of a plastics web that is to be drawn off,
the production variables including one or more production variables from the group consisting of plastics film temperature and film tensile forces acting on the plastics film in the transverse direction and/or length direction,
the process model linking or associating the production variables with product characteristics of the plastics film to be manufactured by the machine, and
the product characteristics including one or more of the values from the group consisting of tensile strength, E-modulus, film thickness and film turbidity,
wherein the sensor model is bidirectional, such that specifying settable machine variables results in values of production variables that are derived therefrom or linked or associated therewith and, vice versa, specifiable production variables result in machine variables that are correlated or linked therewith, and wherein the process model is bidirectional such that specifiable production variables result in product characteristics for the film treatment that are linked therewith or abstracted therefrom or correlated therewith and, vice versa, specifiable product characteristics result in production variables that are linked therewith, correlated therewith or abstracted therefrom.

2. The control apparatus according to claim 1, wherein a plurality of plant zones or plant segments is provided for different stages of the production process of a manufacturing procedure comprising a plurality of successive process stages, identical method parameters being specified within each plant zone or each plant segment, and corresponding sensor model accordingly links, correlates and/or associates machine variables assigned to said plant zone or said plant segment with production variables, and the related process model accordingly links, correlates and/or associates corresponding production variables with process variables.

3. The control apparatus according to claim 2, wherein the process variables that are dependent on the plant zones and/or plant segments are mutually associated in stages, according to the movement and/or draw-off path of the plastics film, such that the output process values of a preceding zone or of a preceding segment correspond to the corresponding input values of a following plant zone or a following plant segment.

4. The control apparatus according to claim 2, wherein the process variables that are dependent on the zones or segments are mutually associated, with respect to the plastics film to be treated, in the direction of the advancing material web, such that the process variables at the output of the last zone or of the last segment correspond to the product characteristics of the plastics web to be treated.

5. The control apparatus according to claim 1, further comprising an input/output device configured to display and/or input corresponding product characteristics, process variables and machine variables.

6. The control apparatus according to claim 1, wherein the control apparatus processor is structured such that, when the process variables relating to a plastics film to be manufactured are set differently, the machine variables are set automatically by the control apparatus.

7. The control apparatus according to claim 1, wherein the control apparatus processor is structured such that, when the process variables relating to a plastics film to be manufactured are set differently, the machine variables are proposed semi-automatically by the control apparatus and can subsequently be confirmed and/or amended.

8. The control apparatus according to claim 1, wherein the process model is combinable with various sensor models.

9. A control apparatus for manufacturing films, comprising a processor configured to provide elements comprising:
a machine-dependent sensor model operatively coupled to a plurality of sensors monitoring a film production line, the sensor model qualitatively and quantitatively establishing a link between machine variables and process variables, wherein the machine variables are characteristics of the film production line and the process variables are characteristics of material to be processed by the film production line; and
a production-dependent process model that qualitatively and quantitatively establishes a link between production variables and product characteristics, wherein the production variables are process variables that describe a production process of a manufacturing procedure and the product characteristics are process variables that describe a final product, wherein the sensor model and the process model are structured to interoperate together to provide settable machine variables for controlling the film production line, the machine-dependent sensor model and the production-dependent process model being mutually associated by production variables including one or more of plastics film temperature, and film tensile forces acting on a plastics film in the transverse direction and/or length direction, the sensor model linking or associating the settable machine variables with production variables, the settable machine variables including one or more machine variables comprising cooling water temperature, heating temperature of heating systems, fan speeds of a ventilator, and tensile stresses in the transverse and/or length direction of a plastics web that is to be drawn off, the process model linking or associating the production variables with product characteristics of a plastics film to be manufactured based on the settable machine variables, the product characteristics including one or more of tensile strength, E-modulus, film thickness and film turbidity, wherein the process model is portable between different film production lines.

10. The control apparatus of claim 9 wherein the links comprise transfer functions.

11. The control apparatus according to claim 9, wherein the production process comprises a plurality of plant zones or plant segments for different stages, the different stages comprising a plurality of process stages performed in a sequence, identical method parameters being specified within each plant zone or each plant segment,
wherein the sensor model is configured to link, correlate and/or associate machine variables assigned to said plant zones or said plant segments with production variables, and
wherein the process model is configured to link, correlate and/or associate corresponding the production variables with process variables.

12. The control apparatus according to claim 11, wherein the process variables that are dependent on the plant zones and/or plant segments are mutually associated in stages, according to movement and/or draw-off path of the plastics film, such that output process values of a preceding zone or of a preceding segment in the sequence of process stages correspond to the corresponding input values of a following plant zone or a following plant segment in the sequence of process stages.

13. The control apparatus according to claim 11, wherein the process variables that are dependent on the plant zones or plant segments are mutually associated, with respect to a plastics film to be treated, in the direction of an advancing material web, such that the process variables at an output of a last zone or of a last segment correspond to the product characteristics of the plastics web to be treated.

14. The control apparatus according to claim 9, further comprising an input/output device configured to display and/or input corresponding product characteristics, process variables and machine variables.

15. The control apparatus according to claim 9, wherein the processor is structured such that, when process variables relating to a plastics film to be manufactured are set differently, machine variables are set automatically by the control apparatus.

16. The control apparatus according to claim 9, wherein the processor is structured such that, when process variables relating to a plastics film to be manufactured are set differently, the machine variables are generated semi-automatically by the control apparatus for subsequent confirmation and/or amendment.

17. The control apparatus according to claim 9, wherein the process model is combinable with any of a plurality of sensor models.

* * * * *